United States Patent Office 2,966,703
Patented Jan. 3, 1961

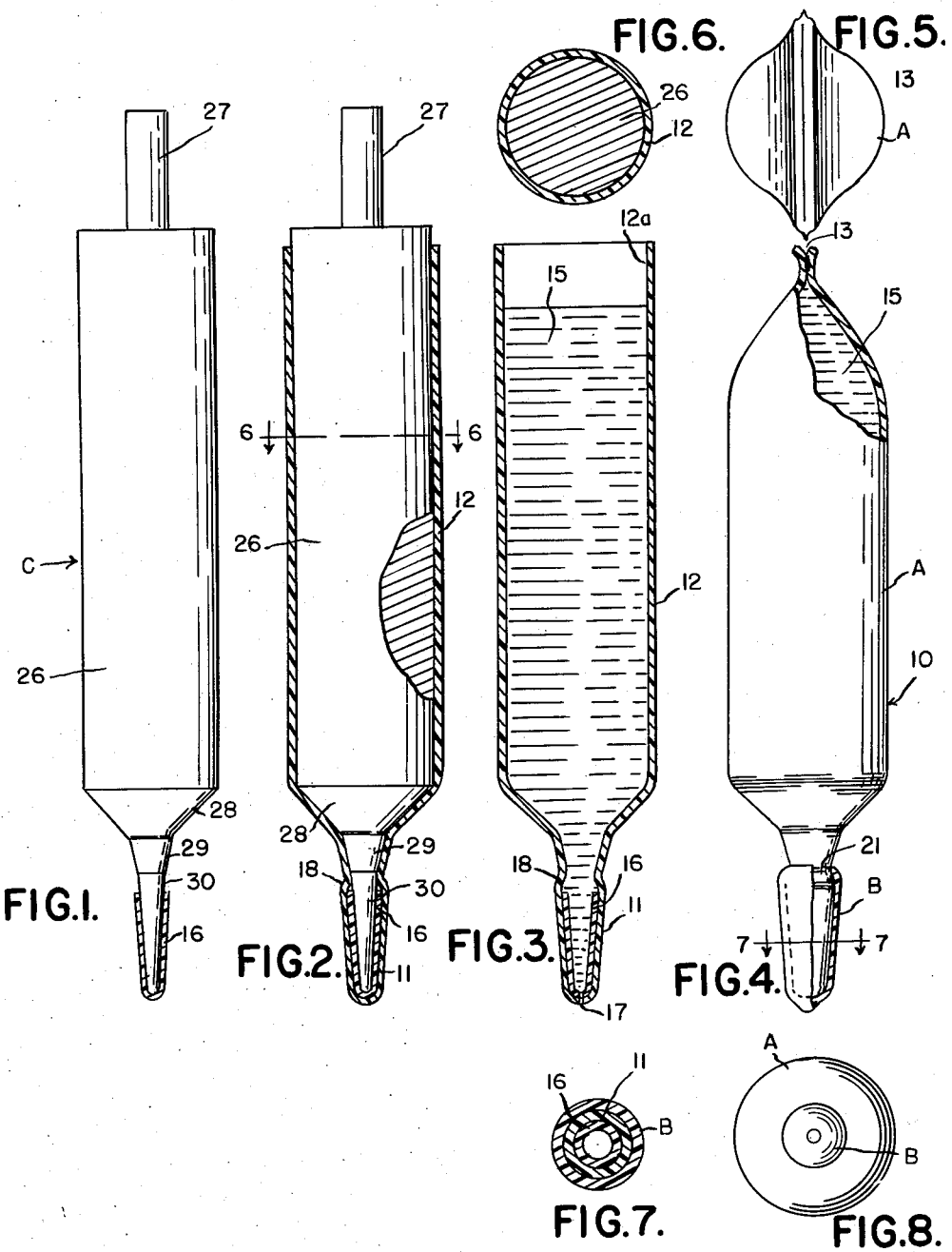

2,966,703

METHOD OF MAKING A COMPOSITE TUBE STRUCTURE

Jack B. Harman, Royal Oak, Mich., assignor to Watts Electric & Mfg. Co., Birmingham, Mich., a corporation of Michigan Filed Sept. 15, 1958, Ser. No. 761,185

2 Claims. (Cl. 18—58.7)

This invention relates generally to a method of making a composite tube structure for containing and dispensing fluid materials, such as liquids and pastes.

One of the essential objects of this invention is to make a composite tube structure by an improved method comprising the steps of preheating a mandrel, dipping the free end of the preheated mandrel into plastic material in liquid form and of high hardness to cause the free end portion of the preheated mandrel to be coated with said plastic material to form an under-support for the nose or spout portion of the tube, allowing the plastic to set after the mandrel with the plastic coating has been removed from the tank, reheating the mandrel with the plastic coating, then dipping the free end portion of the mandrel with the first plastic coating thereon into plastic material in liquid form and of low hardness to cause the first plastic and an additional predetermined length of the mandrel to be coated by the plastic material of low hardness, then fusing the plastic coating of low hardness to the plastic coating of high hardness and allowing the fused coatings to set, removing the mandrel from the set plastic coatings whereby an open plastic tube end is exposed, filling the composite plastic tube with a liquid, paste or other material to a desired level, and then sealing the open end of the plastic tube by pressing and heating opposite tube sides together to cause a fusing and sealing therebetween.

Other objects, advantages and novel details of construction of the invention will be made more apparent as this description proceeds, especially when considered in connection with the accompanying drawings, wherein:

Figure 1 is an elevational view of the mandrel showing in cross-section the first or nose supporting plastic coating on the end nose portion thereof.

Figure 2 is an elevational, partially sectioned view of the mandrel in Figure 1, having the second coating of plastic formed thereon.

Figure 3 is a view of a composite plastic tube structure with the mandrel removed and filled with a fluid material.

Figure 4 is a view partially sectioned of the tube of Figure 3 with the end sealed.

Figure 5 is an end elevation of the tube in Figure 4.

Figure 6 is a section taken at 6—6 of Figure 2.

Figure 7 is an enlarged section taken at 7—7 of Figure 4.

Figure 8 is an elevational view of the spout end of the tube shown in Figure 4.

In the drawings, A is the tube portion and B is the cap portion of a tube construction 10. The tube portion A is made by my method.

As shown, the tube portion A is formed from a relatively soft, durable plastic material, usch as a vinyl plastisol of low durometer, and comprises a spout portion 11, a hollow, substantially cylindrical body portion 12 having open end 12A and integral with and continuing from the spout portion 11 with the body portion 12 terminating in a sealed, rectilinear end portion 13.

A fluid mixture 15 is contained within body 12 of tube A and may be comprised of a lubricant or cleaner or other material adapted for application by a tube structure. Fused to the inner side of the end portion of spout 11 is a supporting plastic core 16 of a relatively hard plastic material, such as a polyvinyl chloride plastisol of high durometer, which increases the usefulness of the composite tube structure A by increasing the durability of the end portion and preventing the end or spout portion 11 from becoming pinched before the tube contents reach an opening 17, which may be formed through the ends of core 16 and spout 11 just immediately prior to the first use.

The structure of cap B conforms generally to that of spout 11 and is of a sufficiently large size to slip thereover. A rim 21 is formed at the open end of cap B and is adapted to engage the shoulder 18 formed just between the spout 11 and the body portion 12 of tube A, when the cap is inserted on the spout of tube A.

In addition to forming a cap structure B from a plastic material of different hardness from that of tube A, it is also formed from a plastic material of different color so that its presence may be immediately determined and also provides a two-toned effect. Preferably, the tube portion A is formed from a blue plastic material, while the cap B is formed from a bright yellow plastic material.

In use, the cap B is removed from the tube A while the tube contents 15 are urged through outlet 17 by pressure applied to the tube sides. After use, the cap B is moved over the surface of spout 11 until rim 21 engages shoulder 18 at which time the cap and spout surfaces come into engagement to provide a secure fitting between the cap and spout.

The apparatus for making the aforesaid composite tube comprises mandrel C. As shown the mandrel C has an elongated cylindrical body portion 26 connected at one end to a tang 27 and tapered inwardly at the other end to form successive conical surfaces 28, 29 terminating in pointed nose portion 30.

The mandrel C may be suspended in a vertical position from a horizontally movable conveyor (not shown) which, in predetermined points of its orbit, is depressed by the suitable cams (not shown), to cause the pointed nose portion 30 of the mandrel to dip into a plastic material in liquid form of a high hardness in one tank or trough (not shown), and after an interval to dip into a depth of plastic material of a relatively low hardness in a second tank or trough (not shown), sufficiently to cover substantially all of body portion 26 of the mandrel, whereby said pointed nose portion 30 will first be coated by a plastic material of high hardness to form the reinforcing core 16 of the composite tube structure, and the core and body portion 26 will be coated with a plastic material of relatively low hardness to form the tube body 12.

Preferably, the mandrel C is preheated by means (not shown) before pointed nose 30 is dipped into the plastic material of high hardness to form the reinforcing core 16 of the tube construction, and again heated by means (not shown) to partially fuse the core 16 thereon, and then the pointed nose portion 30 with its partially fused initial coating thereon and the reheated mandrel body 26 are dipped into a plastic material of low hardness to a depth sufficient to cover substantially all of the mandrel body portion.

The mandrel C is then preferably heated again to cause the plastic coating of low hardness to be fused to the initial plastic coating of high hardness.

The mandrel C is then cooled and removed from the tube A thereby exposing an upwardly facing open end 12-A into which is deposited a filling 15 which may be a lubricant, a cleanser, a sealing material, an adhesive, or any flowable material desired to be contained therein, by means (not shown) at a further station along the conveyor orbit.

At a succeeding conveyor station, a pair of heated press members (not shown) are brought together from opposite tube sides at the open tube end to press and seal the tube end together at junction 13 whereby a completed, filled composite tube structure is formed. The tube A is now ready for receiving the cap member B.

Thus, specifically, my method of making the composite tube A comprising the steps of preheating the mandrel C, then dipping the free end nose 30 of the preheated mandrel into plastic material in liquid form and of high hardness to cause the free end nose 30 to be coated with a plastic material to form reinforcing core 16 of the tube structure, then heating the mandrel C again to partially fuse the plastic coating thereon, then dipping the free end portion 30 of the reheated mandrel with the partially fused plastic coating thereon into plastic material in liquid form of low hardness and preferably of a predetermined color, such as blue, to cause the plastic coating 16 on the free end portion 30 and the body portion 26 of mandrel D to be coated with a plastic material of low hardness, then heating the mandrel C again to fuse the plastic coating of high hardness to the plastic coating of low hardness, then moving the mandrel C to a cooling and removal station wherein the plastic coatings are set and the mandrel C is removed therefrom exposing an upwardly facing opening 12-A, to fill the open empty tube with a desired material to a point just below the open end 12-A, and to heat and press together opposite sides of the open end 12-A to form a sealed joint 13.

While in a preferred embodiment of my invention the body portion is formed over core 16, this could be reversed if desired.

The plastic material used in the above method is a plastisol or a vinyl chloride type dispersion resin of small ultimate particle size, dispersed in a plasticizer. It is also possible to use a polyethylene plastic heated to molten form to receive in a dipping operation a cold mandrel.

The drawing and the foregoing specification constitute a description of the improved method for making a composite tube structure, in such full, clear, concise and exact terms as to enable any person skilled in the art to practice the invention, the scope of which is indicated by the appended claims.

What I claim as my invention is:

1. The method of making a completely molded composite tube construction comprising the steps of preheating an elongated mandrel having an axis and a free end elongated spout portion including successive first, intermediate and terminal conical sections each tapering less toward the axis of the mandrel and terminating in a rounded end, dipping the free end of the preheated mandrel into a first plastic material in liquid form which sets to a high hardness, to a depth sufficient to substantially cover the terminal conical section, so that said plastic material will envelop and form a first coating directly upon said terminal conical section to form a hard supporting core, heating said mandrel to at least partially fuse said first coating on the terminal conical section, then dipping said mandrel with said first coating into a second plastic material in liquid form which sets to provide a second coating of relatively low hardness, to a depth to cover said first coating and a predetermined length of said mandrel above said elongated spout portion to form a tube including a spout having a shoulder therein which is reinforced by one end of said supporting core, heating said mandrel to fuse said first coating to said second coating, and removing said mandrel from said fused first and second coatings to provide a composite tube structure having a hard under support for the spout portion and a reinforced shoulder on said spout portion for retaining a cap thereon.

2. The method of making a completely molded composite tube construction comprising the steps of preheating an elongated mandrel having an axis and a free end elongated spout portion including successive first, intermediate and terminal conical sections each tapering less toward the axis of the mandrel and terminating in a rounded end, dipping the free end of the preheated mandrel into a first plastic material in liquid form which sets to a high hardness, stopping the dipping of the preheated mandrel in said first plastic material at a depth whereat the first plastic material just covers the terminal conical section, so that said first plastic material forms a hard supporting core directly upon said terminal conical section, removing the mandrel from said first plastic material, heating said mandrel to at least partially fuse said supporting core on the terminal conical section, then dipping said mandrel with said supporting core thereon into a second plastic material in liquid form to form an outer coating which sets to a relatively low hardness, to a depth to cover said supporting core and a predetermined length of said mandrel above said elongated spout portion whereby a cap retaining shoulder is formed on said spout portion which shoulder is reinforced by the end of said supporting core, removing said mandrel from said second plastic material, heating said mandrel to fuse said supporting core to said outer coating, and removing said mandrel from said fused supporting core and outer coating to provide a composite tube structure having a hard under support for the spout portion thereof and the cap retaining shoulder thereon.

References Cited in the file of this patent

UNITED STATES PATENTS

| 706,541 | Feval | Aug. 12, 1902 |
| 772,161 | Longden | Oct. 11, 1904 |
| 1,472,256 | Stringfield | Oct. 30, 1923 |
| 1,527,659 | Wilkie | Feb. 24, 1925 |
| 1,828,990 | Watkins et al. | Oct. 27, 1931 |
| 1,896,123 | Schweitzer | Feb. 7, 1933 |
| 1,909,726 | Serenyi | May 16, 1933 |
| 2,167,724 | Murphy et al. | Aug. 1, 1939 |
| 2,297,690 | Nitardy | Oct. 6, 1942 |
| 2,320,583 | Forro | June 1, 1943 |
| 2,416,962 | Stather-Dunn et al. | Mar. 4, 1947 |
| 2,786,238 | Shapero | Mar. 26, 1957 |
| 2,815,896 | Shapero et al. | Dec. 10, 1957 |

FOREIGN PATENTS

| 726,784 | Great Britain | Mar. 23, 1955 |